Feb. 10, 1948.  H. PEARCE  2,435,752
CAMERA DIAPHRAGM SETTING ARRANGEMENT
Original Filed April 20, 1943
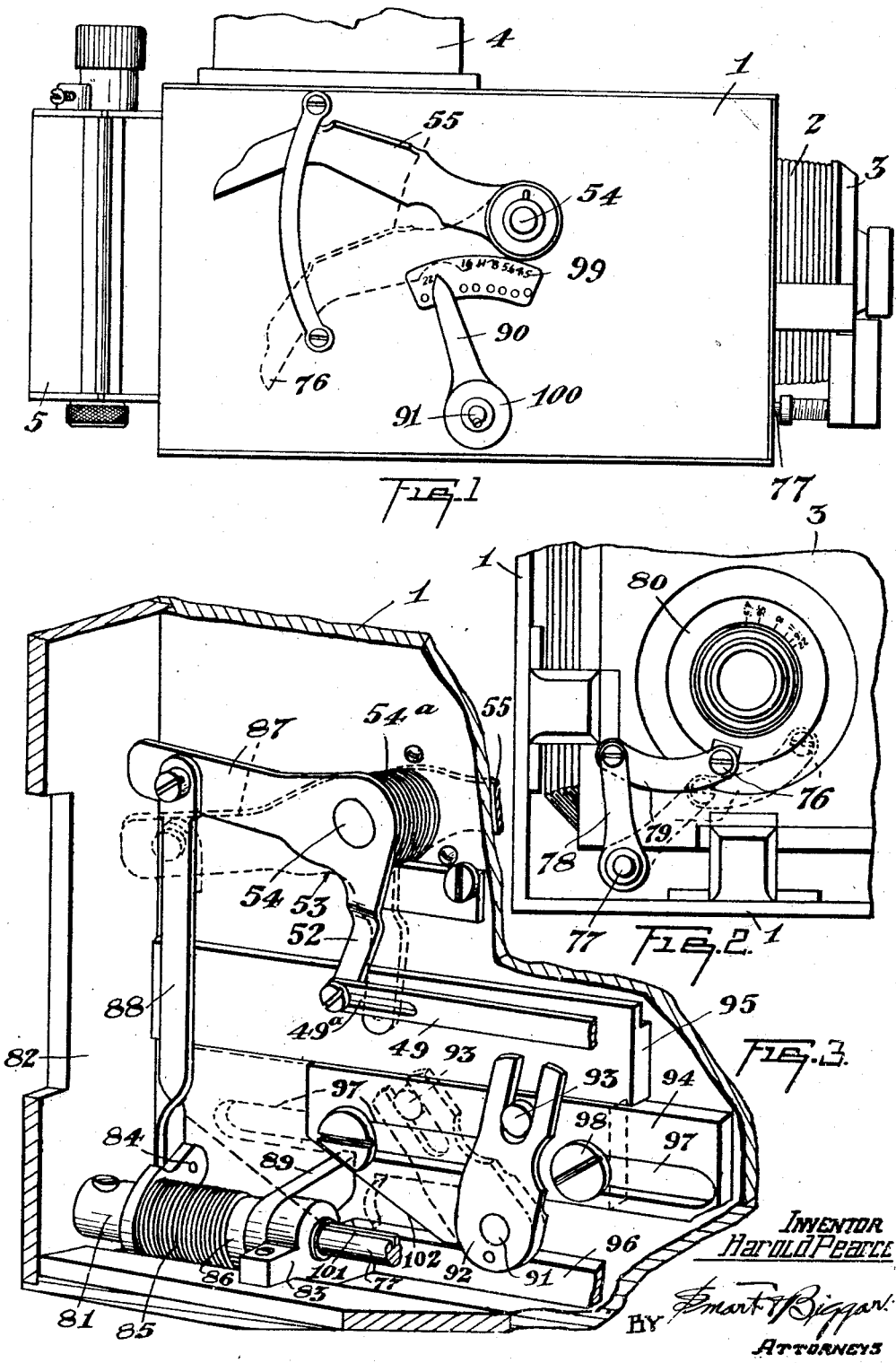
INVENTOR
Harold Pearce
BY Smart & Biggar
ATTORNEYS Patented Feb. 10, 1948

2,435,752

UNITED STATES PATENT OFFICE 2,435,752

CAMERA DIAPHRAGM SETTING ARRANGEMENT

Harold Pearce, Ottawa, Ontario, Canada, assignor to The Honorary Advisory Council for Scientific and Industrial Research, Ottawa, Ontario, Canada, a corporation of Canada Original application April 20, 1943, Serial No. 483,771. Divided and this application February 23, 1945, Serial No. 579,403

1 Claim. (Cl. 95—64)

This invention relates to diaphragm setting arrangements for cameras.

It is well known that in focussing a camera it is desirable to have the diaphragm open to the fullest extent so that maximum light may be obtained for focussing purposes. On the other hand for the taking of the picture it may be necessary to close the diaphragm to quite a small opening. Particularly if pictures are to be taken in rapid succession the necessary adjustment of the diaphragm between each picture in order to obtain maximum light for focussing purposes is a disadvantage.

The present invention has been designed to overcome this disadvantage by providing an arrangement which makes it possible to predetermine the diaphragm setting at which the picture will be taken, without, however, moving the diaphragm at all, so that the latter remains at its full open position for focussing but is brought to the proper degree of opening for the taking of the picture just before the shutter opens. The arrangement is such that a number of successive pictures may be taken at the same diaphragm opening without any manipulation of the diaphragm setting mechanism and yet between each picture the diaphragm will return to its fully opened position.

The invention is illustrated in more detail in the accompanying drawings, in which Figure 1 is a side view of a camera showing the shutter operating lever and the diaphragm setting indicator;

Figure 2 is a partial front view of the camera showing the mechanism for shutting the diaphragm; and Figure 3 is a detail of the means for predetermining the diaphragm setting and subsequently bring the diaphragm to that setting.

As shown in Figure 1, the camera comprises the usual casing 1, extensible bellows 2 and a lens and diaphragm holding casing 3 at the outer end of the bellows. On top of the casing is a focussing hood 4 and at the rear is a suitable holder 5 for light sensitive material, which, in the case illustrated, is in the form of a film.

Fixed on the outer end of a shaft 54 extending through the side wall of the casing is a lever 55 which, upon depression from its full line to its dotted line position, operates the shutter mechanism of the camera through the arm 52 of the bell crank 53 and the link 49 (Fig. 3) which is connected to such mechanism.

The diaphragm setting mechanism is illustrated in Figures 2 and 3. Fixed to the end of a rod 77, which extends longitudinally of the camera, is an arm 78 connected by means of a link 79 to the diaphragm setting ring 80 of the camera. When the parts are in the full line position shown in Figure 2 the diaphragm is adjusted to its largest opening, while when they are in the dotted line position of that figure, the diaphragm is adjusted to its smallest opening. The rod 77 is slidable in and keyed to a sleeve 81 rotatably carried in a transverse wall 82 of the casing 1 and in a bearing 83. The rod thus turns with the sleeve but may slide through it as the bellows 2 is extended or collapsed.

The sleeve 81 is adapted to be turned by movement of the bell crank 53 fixed to the inner end of the shaft 54. An arm 87 of this bell crank is connected by means of a link 88 to the outer end of an arm 84 which can turn freely on the sleeve 81 but is connected to the latter by a spring 85 having one end secured to the arm and the other end to a collar 86 on the sleeve. The strength and tension of the spring 85 are so adjusted that unless the sleeve 81 is positively prevented from turning, any turning movement of the arm 84 will turn the sleeve correspondingly. The bell crank 53 is normally held by the spring 54a in the position shown in dotted lines in Figure 3. When the bell crank is in this position, it acts through the link 88, arm 84, spring 85, sleeve 81 and rod 77 to hold the arm 78 and link 79 in the full line position of Figure 2 and thus to keep the diaphragm adjusted at its maximum stop. Provided that the sleeve 81 and thus the rod 77 are not prevented from following movement of the arm 84, movement of the bell crank 53 from the dotted line to the full line position of Figure 3 will move the parts 78 and 79 to the dotted line position of Figure 2 and will thus reduce the diaphragm opening to its minimum.

The extent to which the diaphragm opening will actually be altered during such movement of the bell crank 53 is determined by the adjustment of a slide 94, which is movable in rails 95 and 96 to an extent governed by the coaction of slots 97 in the slide and pins 98 on the side wall of the casing 1, the two extreme positions of the slide being shown respectively in full and dotted lines in Figure 3. The slide has a forward inclined face 102 which lies in the path of turning movement of an arm 89 fixed to the sleeve 81. When the bell crank 53 is in its normal dotted line position, the outer end of the arm 89 lies in an opening 101 in the bottom rail 96 for the slide. If the slide is in the dotted line position, then it will prevent any movement of the arm 89, with the result that all movement of the arm 84 will be absorbed in tightening the spring 85 and the sleeve 81 will stay still. On the other hand, when the slide 94 is in its full line position, movement of the arm 89 and thus of the sleeve 81 is not interfered with at all, as the arm 89 strikes the inclined face 102 only as the link 88 completes its upward movement. When the slide is in some intermediate position, then part of the turning movement of the arm 84 is communicated to the sleeve 81 and rod 77, but the remainder, after the arm 89 strikes the face 102, is absorbed in tightening the spring.

The position of the slide 94 is governed by an indicator 90 (Figure 1) which can be adjusted by means of a knob 100 to a desired position on a diaphragm opening scale 99. The indicator is fast to the outer end of a shaft 91 extending through the wall of the casing 1 and having fixed to its inner end an arm 92 with a forked end which embraces a pin 93 on the slide. When the indicator 90 is in the position shown in Figure 1 the arm 92 is in the full line position of Figure 3, while when the indicator is at the extreme right of the scale the arm 92 is in the dotted line position of Figure 3.

If a picture is to be taken at a stop of, say f.11, the indicator 90 is moved to the appropriate point on the scale 99. It will be appreciated that, because the end of the arm 89 normally lies in the opening 101 in the rail 96, this movement and the resultant movement of the slide 94 causes no movement of the diaphragm setting ring, so that the diaphragm remains open to its full extent for focussing. When the photograph is to be taken, the operating lever 55 is depressed, thus turning the crank 53 towards the full line position of Figure 3. The diaphragm is accordingly closed to the required extent but is then prevented from closing further by engagement of the arm 89 with the inclined face 102 of the slide 94. Continued movement of the crank 53 merely tightens the spring 85 and finally, when the lost motion in the connection 49a has been taken up, moves the link 49 connected to the shutter mechanism to trip the latter. When the lever 55 is released, the diaphragm returns to its maximum opening ready for focussing and upon the taking of the next photograph will again be closed to the same stop unless in the meantime the indicator 90 has been moved.

This application is a division of my co-pending application Serial No. 483,771, filed April 20, 1943.

What I claim as my invention is:

A camera comprising an adjustable diaphragm, a shutter, a lost motion shutter tripping mechanism, a longitudinally extending rod so connected to the diaphragm that rotation of the rod varies the diaphragm opening, a resilient connection between said rod and said shutter tripping mechanism sufficiently strong to rotate said rod upon movement of said mechanism in the absence of obstruction to such rotation, means for predetermining the size of the diaphragm opening without moving the diaphragm, said means including a manually adjustable diaphragm opening indicator unconnected with the diaphragm, an arm rotatable with the rod and extending radially therefrom, a slide movable parallel to the rod and having an inclined face against which said arm is adapted to strike, and means connected to the indicator for moving the slide to vary the point on said face against which said arm strikes.

HAROLD PEARCE.

REFERENCES CITED

The following references are of record in the file of this patent:

UNITED STATES PATENTS

| Number | Name | Date |
| --- | --- | --- |
| 720,586 | Holst | Feb. 17, 1903 |
| 716,021 | Folmer | Dec. 16, 1902 |
| 907,486 | Felt | Dec. 22, 1908 |
| 2,311,822 | Frankel | Feb. 23, 1943 |
| 2,371,524 | Kals | Mar. 13, 1945 |
| 2,343,206 | Rath | Feb. 29, 1944 |